United States Patent [19]
Christian

[11] Patent Number: 5,493,814
[45] Date of Patent: Feb. 27, 1996

[54] WEATHERSTRIP ASSEMBLY INCLUDING A GLASS RUN CHANNEL AND BELT WEATHERSTRIP WITH DECORATIVE COVER

[75] Inventor: Willard C. Christian, Lambertville, Mich.

[73] Assignee: The Standard Products Company, Cleveland, Ohio

[21] Appl. No.: 228,657

[22] Filed: Apr. 18, 1994

[51] Int. Cl.$^6$ ........................................ E06B 7/16
[52] U.S. Cl. .................. 49/479.1; 49/377; 49/440; 49/490.1; 49/506
[58] Field of Search ................ 49/479.1, 490.1, 49/399, 440, 441, 506

[56] References Cited

U.S. PATENT DOCUMENTS

| | | |
|---|---|---|
| 4,888,929 | 12/1989 | Vaughan et al. . |
| 4,910,918 | 3/1990 | Naples et al. . |
| 4,951,418 | 8/1990 | Keys ............................ 49/440 |
| 4,956,943 | 9/1990 | Yamada et al. . |
| 4,975,306 | 12/1990 | Jackson . |
| 5,014,464 | 5/1991 | DuPuy et al. ............. 49/490.1 X |
| 5,042,201 | 8/1991 | Vaughn ..................... 49/479.1 X |
| 5,151,307 | 9/1992 | Jackson . |
| 5,170,586 | 12/1992 | Ose et al. ..................... 49/377 |
| 5,207,027 | 5/1993 | Larsen . |
| 5,311,711 | 5/1994 | Desir, Sr. ................. 49/490.1 X |
| 5,353,549 | 10/1994 | Henderson et al. ........... 49/490.1 |

FOREIGN PATENT DOCUMENTS 0384851  12/1987  European Pat. Off. .

Primary Examiner—Philip C. Kannan
Attorney, Agent, or Firm—Harness, Dickey & Pierce

[57] ABSTRACT

A weatherstrip assembly for an automotive vehicle including a glass run channel formed to shape and provided with a rigid decorative covering. Additionally, a belt weatherstrip is provided which includes a linear portion and an integrally extending tail portion, wherein the tail portion includes a rounded periphery and a substantially flat inner wall which abuts the glass run channel upon attachment.

16 Claims, 5 Drawing Sheets

WEATHERSTRIP ASSEMBLY INCLUDING A GLASS RUN CHANNEL AND BELT WEATHERSTRIP WITH DECORATIVE COVER

BACKGROUND AND SUMMARY OF THE INVENTION

The present invention relates to glass run channels and belt weatherstrips for motor vehicles, and more particularly, to glass run channels and belt weatherstrips wherein the glass run channel includes a permanently attached decorative cover.

Glass run channels are used in motor vehicles to support to movable vehicle door windows for up and down movement and for forming a seal around the window to protect the passenger compartment from the elements. There are a number of different glass run channel designs in use today. Ideally, the glass run channel should be sturdy, capable of supporting the movable window firmly without undue resistance to raising and lowering, be water tight and free from gaps which can whistle in strong winds or when the vehicle is traveling at accelerated speeds. In addition, the glass run channel should be aesthetically pleasing and should be capable of being installed along the vehicle door header and pillar portions in an unobtrusive and aerodynamic manner.

With regard to belt weatherstrips, belt weatherstrips are generally utilized to protect the sheet metal flange areas of a vehicle along the windows beltline or lower surface. Typically, the vehicle door has a welded flange connected to the outer shelf surface portion of the inner frame. Such flanges are commonly provided for forming the window opening. The belt weatherstrip includes a sealing lip for sealing and scraping water off the glass window and an overhanging elastomeric strip portion which rests on the belt shelf of the outer surface of the car door in order to prevent water from entering the flanged area. In the past, many of the known belt weatherstrips either provided an ineffective seal or detracted from the aesthetic characteristics of the automobile.

Accordingly, the present invention provides a glass run channel for supporting a movable pane of glass in a vehicle door window opening. The glass run channel comprises metal reinforced rubber or plastic channel members which are joined in a mitered corner at the intersection of the vehicle door header and a vertical leg of either the A, B or C pillar, respectively, depending upon the embodiment. The channel members are secured together and reinforced by a generally L-shaped reinforcement member which is inserted into, and preferably molded within, an internal channel extending the length of the vehicle door header or pillar portions. Overlapping the entire exterior surface of the exposed glass run channel is a decorative protective covering typically made from stainless steel or a durable plastic which provides the glass run channel with enhanced-aesthetic appeal. Additionally, an L-shaped portion of screen-like mesh is heat staked to the inner surface of the decorative cover to provide enhanced structural effects.

The belt weatherstrip of the present invention is adapted for engagement over the end flange of a vehicle. The belt weatherstrip includes a one-piece core member which includes a first leg and a second leg which generally form a U-shaped member having a width which fits over a flange of the vehicle. An elastomeric coating is extruded over the core member along the first leg and dual layers of rigid material are extruded over the second leg. A plurality of recesses are provided along the first leg for receiving metallic clips which are crimped over the first leg and extend into the U-shaped channel to assist in retaining the belt weatherstrip on the flange. Under one embodiment of the present invention the belt weatherstrip is provided with an extruded tail portion which overlaps the C pillar portion of the glass run channel to seal the lower rear window portion and provide additional aesthetic features.

Other advantages of the present invention will become readily appreciated by reference to the following description and claims, taken in conjunction with the accompanying drawings.

DETAILED DESCRIPTION OF THE PREFERRED EMBODIMENT

Figure 1:
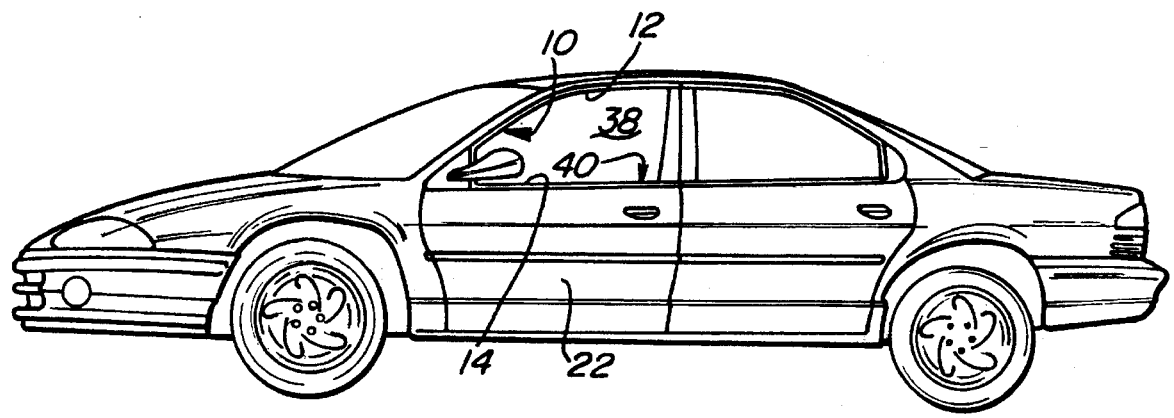
FIG. 1 is a side elevational view of an automotive vehicle showing the general location of the glass run channel and belt weatherstrip embodiments according to the teachings of the present invention.
Figure 2:
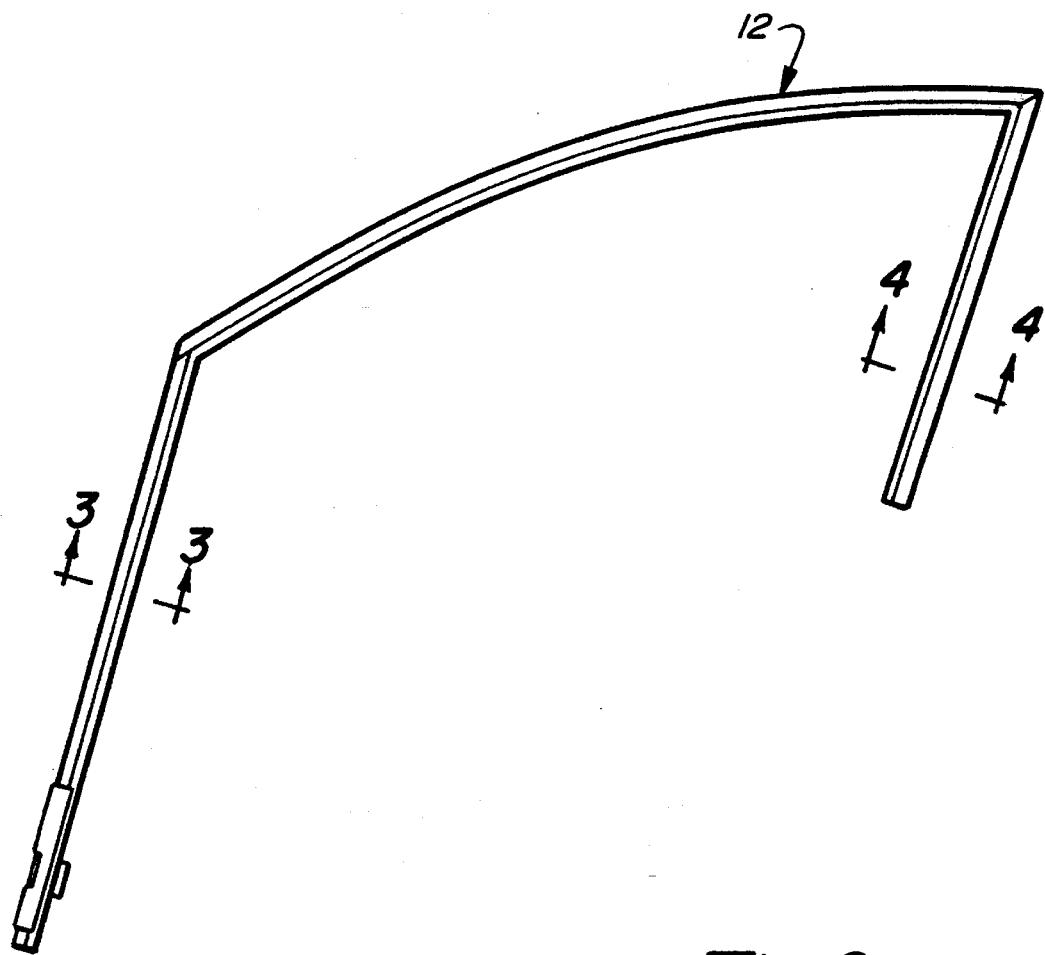
FIG. 2 is an enlarged side elevational view of the glass run channel embodiment for the forward door of an automotive vehicle according to the teachings of the present invention.
Figure 3:
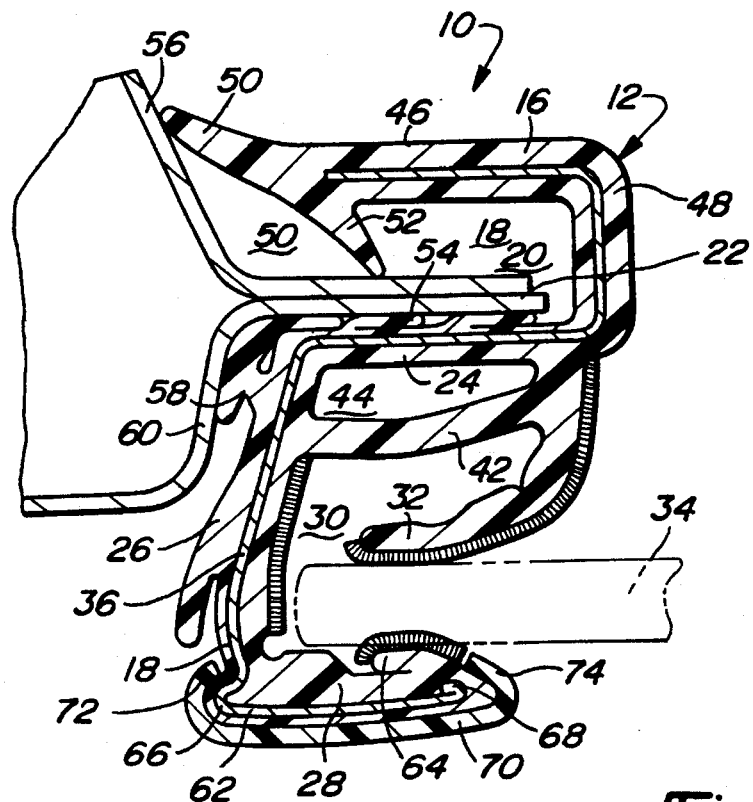
FIG. 3 is a cross-sectional view taken along line 3—3 of FIG. 2 illustrating a glass run channel as attached to the vehicle door flange along an A pillar portion.

In accordance with the teachings of the present invention there is provided a weatherstrip assembly 10 including both a glass run channel 12 which is adapted to fit along a vehicle door window opening and a complimentary belt weatherstrip 14 adapted for engagement over an end flange of a vehicle door as shown in FIG. 1. With regard to the glass run channel 12, as best shown in FIGS. 2 and 3, the glass run channel 12 generally includes, in cross-section a U-shaped portion 16 and an L-shaped portion 18. U-shaped portion 16 defines a mounting channel 20 for mounting the glass run channel 12 over a flange of door 22. The glass run channel 12 is defined by interior leg 24 of U-shaped portion 16 in conjunction with L-shaped cross-section portion 18, having leg 26 extending from interior leg 24 and leg 28 extending generally at a right angle from leg 26. Extending across the window receiving channel 30 is a first sealing lip 32 which serves to substantially close the channel 30 during periods when the glass panel 34 is not engaged within the receiving channel. Extending between the base of the sealing lip 32 and leg 26 is an extending band 42 leaving a gap 44 disposed between the band 42 and the inner leg 24.

Generally, the U-shaped portion 16 and L-shaped portion 18 have a metallic reinforcing core 36 which is covered by a conventional elastomeric material. For some uses core 36 may not be necessary or only a partial core may be necessary. Core 36, as shown in FIG. 3, generally has a shape in side elevation which is configured to fit within window opening 38 on all sides except the bottom horizontal side 40 which must be open to allow the glass panel 34 to extend therethrough. While the U-shaped portion 16 and L-shaped portion 18 of the weatherstrip assembly 10 are described individually hereinafter, it will be appreciated by those skilled in the art that a unitary, one piece construction is preferred as is illustrated in the figures.

The U-shaped cross-section mounting portion 16 generally provides mounting means for attaching the weatherstrip assembly 10 to a flange of the door frame. Thus, U-shaped portion 16 has legs 24 and 46 joining by web portion 48 which provide channel 30 for attachment of the U-shaped portion 16 to a flange. A large rib 52 extends inwardly from leg 46 into channel 20 to engage the flange 22. In opposition to rib 52 are a plurality of protrusions 54 disposed on inner leg 24 to engage flange 22. Extending along the leg 46 outwardly from the mouth of channel 20 is a sealing lip 50 which preferably engages a portion 56 of the door. Additionally, a sealing lip 58 which extends from the leg 26 engages a second portion 60 of the door.

The glass receiving portion of the glass run channel 18 is defined by L-shaped portion 18 in combination with inner leg 24 of U-shaped portion 16. Outward leg 28 of L-shaped portion 18 is adapted to retain the edge of glass panel 34 received in glass receiving channel 30. Leg 62 of core 36 extends almost the entire length of leg 28 to ensure retention of glass panel 34 in channel 30. Lip 28 includes an incurved end portion 64 which extends into the channel 50 to provide further sealing along the glass panel 34. Ideally, the contact surfaces of the leg 32 and incurved end portion 64 will be provided with flocking material to assist in allowing the glass panel 34 to slide into the glass receiving channel 30.

The short leg 62 of the core 36 is modified along each end 66 and 68 to assist in retaining a substantially rigid C-shaped decorative cover 70. The first end 72 of the decorative cover 70 at least partially overlaps the first end portion 66 of short leg 62 and the second end 74 of the decorative cover 70 at least partially overlaps the second end portion 68 of short leg 62 to fully cover the outwardly directed leg 28.

Figure 4:
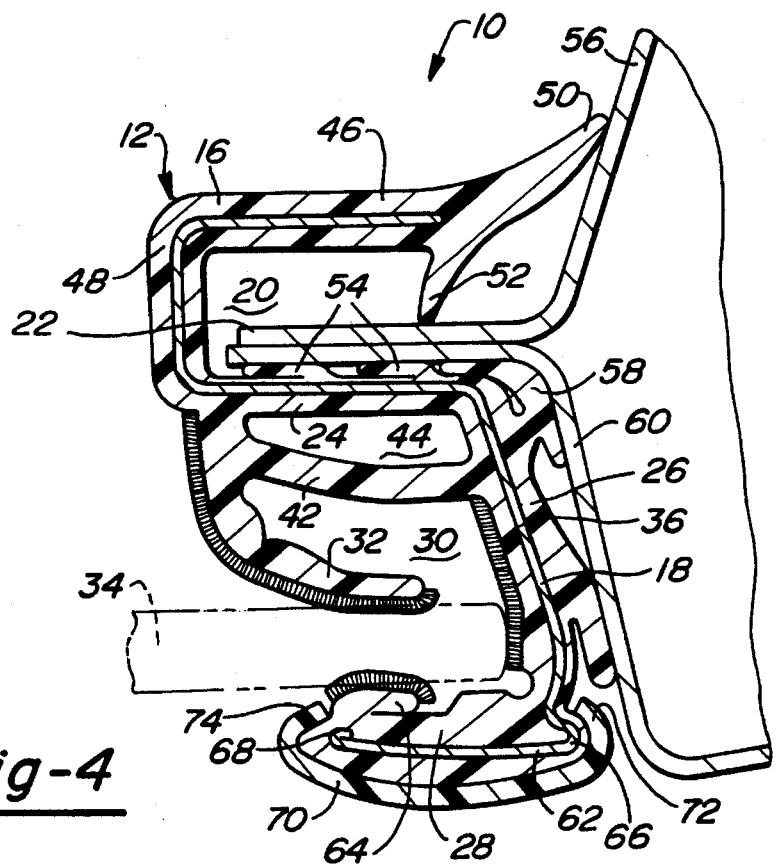
FIG. 4 is a cross-sectional view taken along line 4—4 of FIG. 2 illustrating a glass run channel as attached to the vehicle door flange located along a B pillar portion.

Referring to FIG. 4 a cross-sectional view taken along line 4—4 of FIG. 2 illustrating the glass run portion of the weatherstrip assembly along the B pillar. The weatherstrip assembly located along the B pillar is substantially identical to the weatherstrip assembly along the A pillar portion as illustrated in FIG. 3. Thus, the reference numerals used in FIG. 3 have been applied to FIG. 4 for a better understanding of the invention.

Figure 5:
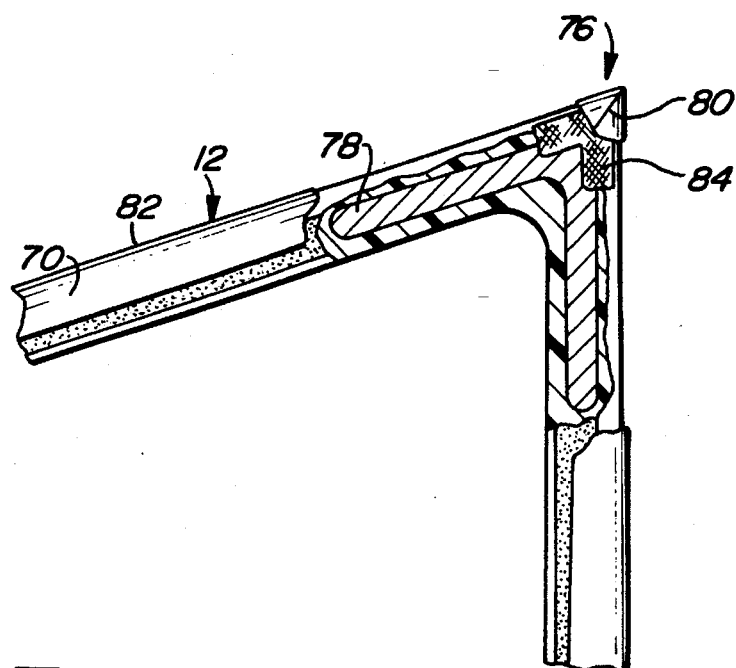
FIG. 5 is an enlarged partial broken away elevational view of a corner portion of the glass run channel.

Referring to FIG. 5 an enlarged side elevation view partially broken away of the glass run channel corner structure 76 is provided. The corner structure 76 includes a reinforcement bracket 78 which strengthens and reinforces the mitered corners 80 of the rigid decorative covering 70 and connects the respective pillar portions to the headliner portion 82. The reinforcement bracket 78 is a substantially L-shaped structure made from metal or durable plastic which is disposed within the gap 44 in both the pillar portion and the headliner portion as illustrated more clearly in FIG. 7. Once the L-shaped bracket has been inserted into the gap 44 an additional amount of elastomeric material is extruded at the corner as will be described below.

Prior to applying the decorative covering the mitered corners of the decorative covering are preferably reinforced by heat staking a wire mesh screen 84 to the back of the rigid decorative covering along the joint formed at the corner. Thereafter the decorative cover is applied over the headliner and B pillar portions.

The process of manufacturing the glass run channel embodiments 12 and 112 of the present invention will now be discussed in greater detail. Initially, a master coil of cold rolled steel is coated with an elastomeric material adhesive promoter and then slit to the desired width. The coil is fed into a rolling mill that forms the shape of the metallic core. The metallic core is then fed into an extrusion die and elastomeric material is extruded over the shaped core. The extrusion is then flocked along the sealing lips and optionally the web. After flocking, the glass run channel is allowed to cure and then is cut to length. Once cut to length, the extrusion is placed into benders which shape the sections along both the header and pillars.

During the bending operation of the header portion, holes for subsequently locating the header during further processing are drilled into the header at the bending machine. Once the holes are drilled the part is removed from the bending machine and attached to a saw such that the locating holes are engaged by locating pins provided on the saw structure. This operation allows the part to be trimmed to exact tolerances. After the extrusion has been shaped as desired, the extrusions are cut to a finished length.

Once the glass run channel portion has been formed a second master coil of the decorative covering material is slit to width, roll formed and cut to the desired length. Again, these cut lengths are placed in a bender which shapes the decorative covering material for both the pillars and headliner portions. Typically, the decorative covering along both the A and C pillar portions are notched and trimmed to the desired length. The B pillar and header portions are typically miter cut and subsequently the header portion located along the A and C pillars are formed to cup over the A and C pillars.

Next, with regard to the first assembly 10, the A and B pillar portions are joined to the header portion by inserting the angled reinforcing bracket into the gaps 44. The B and C pillar portions of assembly 110 are similarly joined to the header portion extending therebetween. The decorative cover is applied over the outer leg of the respective header and pillar portions and brought together. Optionally, but preferably the mesh screen is heat staked to the back of the decorative covering to extend over both portions forming the corner prior to applying the decorative cover. The header and pillar portion are then positioned within a mold such that the locating holes are engaged by pin members for maintaining each section at the desired specification and additional elastomeric material is molded into the back side of the decorative covering to complete the process of manufacturing.

Figure 6:
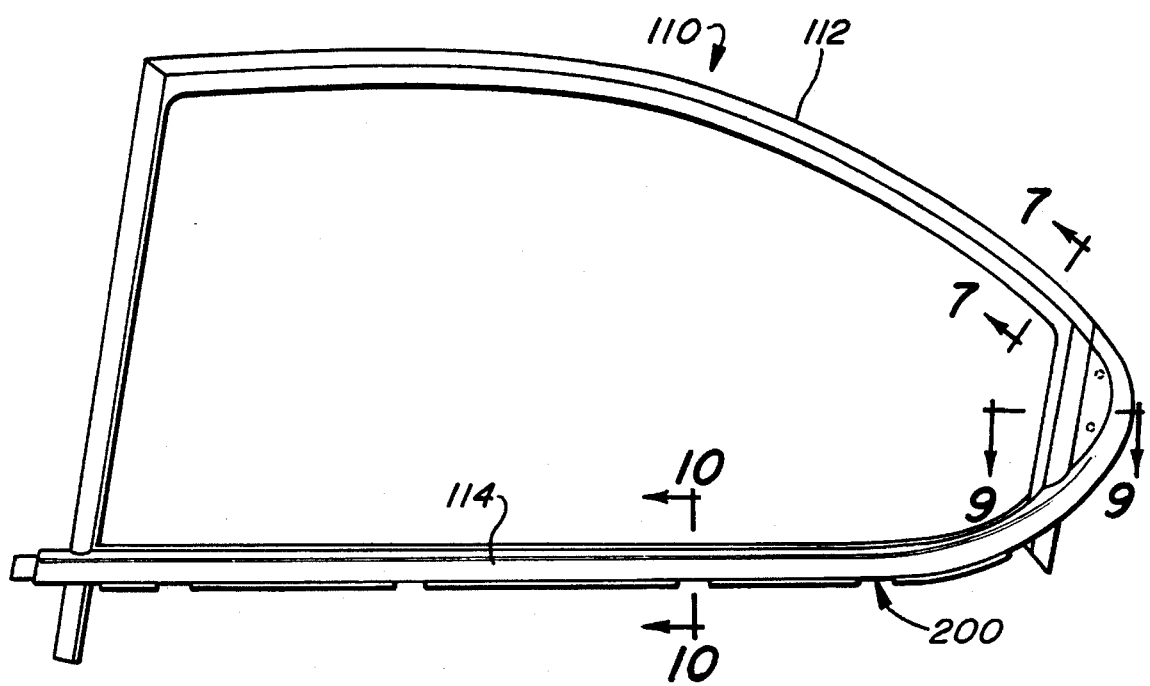
FIG. 6 is an enlarged side elevational view of the glass run channel and complimentary belt weatherstrip embodiment for the rear door of an automotive vehicle according to the teachings of the present invention.

Referring to FIG. 6 an enlarged side elevational view of a weatherstrip embodiment 110 including a glass run channel 112 and complimentary belt weatherstrip 114 according to the teachings of the present invention is provided. With regard to the weatherstrip assembly illustrated with reference to FIGS. 6 through 9 all reference numerals will be increased by one hundred over the reference numerals utilized for identical features in the weatherstrip embodiment illustrated in FIGS. 1 through 5.

Figure 7:
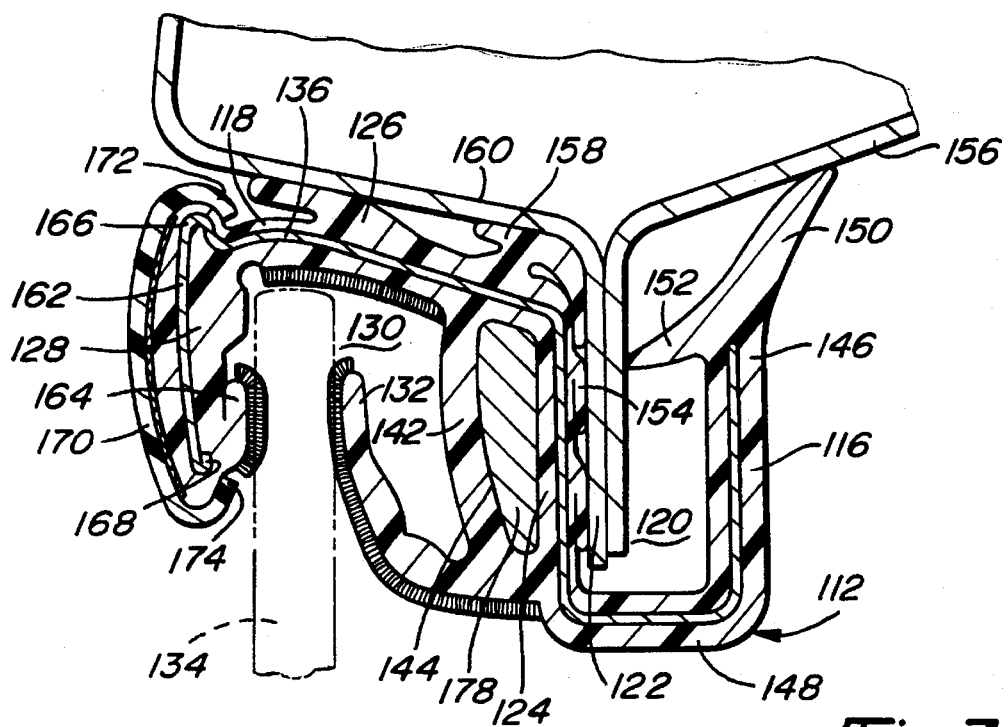
FIG. 7 is a cross-sectional view taken along line 7—7 of FIG. 6 illustrating the glass run channel as attached to the vehicle door flange along a C pillar portion.

Referring to FIG. 7 a cross-sectional view taken along line 7—7 of FIG. 6 is provided. Again, the glass run channel 112 includes a U-shaped portion 116 and an L-shaped portion 118. U-shaped portion 116 defines a mounting channel 120 for mounting glass run channel 112 over a flange of door 122. The glass run channel 112 is defined by interior leg 124 of U-shaped portion 116 in conjunction with L-shaped cross-section portion 118, having leg 126 extending from interior leg 124 and leg 128 extending generally at a right angle from leg 126. Extending across the window receiving channel 130 is a first sealing lip 132 which serves to substantially close the channel 130 during periods when the glass panel 134 is not engaged within the receiving channel. Extending between the base of the sealing lip 132 and leg 126 is an extending band 142 leaving a gap 144 disposed between the band 142 and the inner leg 124.

Generally, the U-shaped portion 116 and L-shaped portion 118 have a metallic reinforcing core 136 which is covered by a conventional elastomeric material. For some uses core 136 may not be necessary or only a partial core may be necessary. Core 136, as shown in FIG. 7, generally has a shape in side elevation which is configured to fit within window opening 38 on all sides except the bottom horizontal side 40 which must be open to allow the glass panel 134 to extend therethrough as shown in FIG. 1. While the U-shaped portion 116 and L-shaped portion 118 of the weatherstrip assembly 110 are described individually hereinafter, it should again be appreciated by those skilled in the art that a unitary, one piece construction is preferred as is illustrated in the figures.

The U-shaped cross-section mounting portion 116 generally provides mounting means for attaching the weatherstrip assembly 110 to a flange of the door frame. Thus, U-shaped portion 116 has legs 124 and 146 joining by web portion 148 which provide channel 130 for attachment of the U-shaped portion 116 to a flange. A large rib 152 extends inwardly from leg 146 into channel 120 to engage the flange 122. In opposition to rib 152 are a plurality of protrusions 154 disposed on inner leg 124 to engage flange 122. Extending along the leg 146 outwardly from the mouth of channel 120 is a sealing lip 150 which preferably engages a portion 156 of the door. Additionally, a sealing lip 158 which extends from the leg 126 engages a second portion 160 of the door.

The glass receiving portion of the glass run channel 118 is defined by L-shaped portion 118 in combination with inner leg 124 of U-shaped portion 116. Outward leg 128 of L-shaped portion 118 is adapted to retain the edge of glass panel 134 received in glass receiving channel 130. Leg 162 of core 136 extends almost the entire length of leg 128 to ensure retention of glass panel 134 in channel 130. Leg 128 includes an incurved end portion 164 which extends into the channel 150 to provide further sealing along the glass panel 134. Preferably, the contact surfaces of the leg 132 and incurved end portion 164 are provided with flocking material to assist in allowing the glass panel 134 to slide into the glass receiving channel 130.

The short leg 162 of the core 136 is modified along each end 166 and 168 to assist in retaining a substantially rigid C-shaped decorative cover 170. The first end 172 of the decorative cover 170 at least partially overlaps the first end portion 166 of short leg 162 and the second end 174 of the decorative cover 170 at least partially overlaps the second end portion 168 of short leg 162 to fully cover the outwardly directed leg 128.

Figure 8:
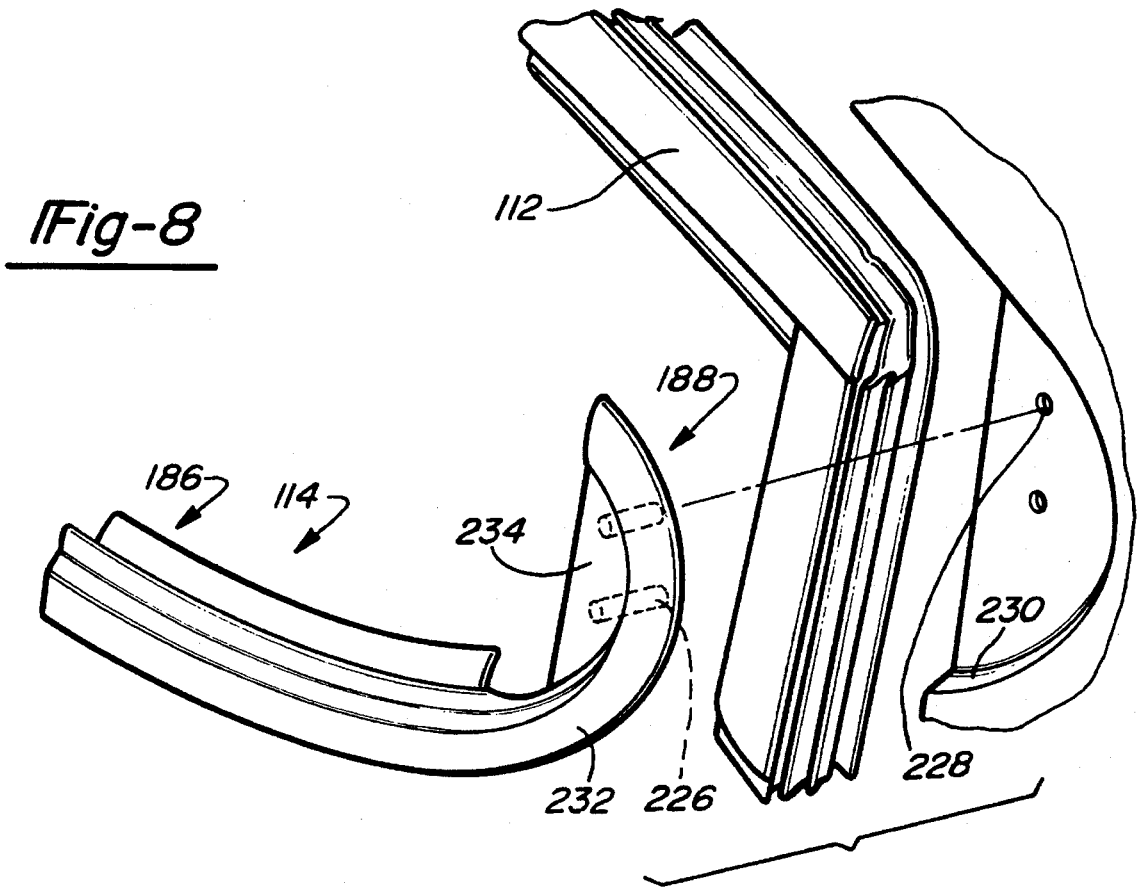
FIG. 8 is an enlarged blown apart view of a glass run channel and complimentary belt weatherstrip for the rear door of an automotive vehicle according to the teachings of the present invention.
Figure 9:
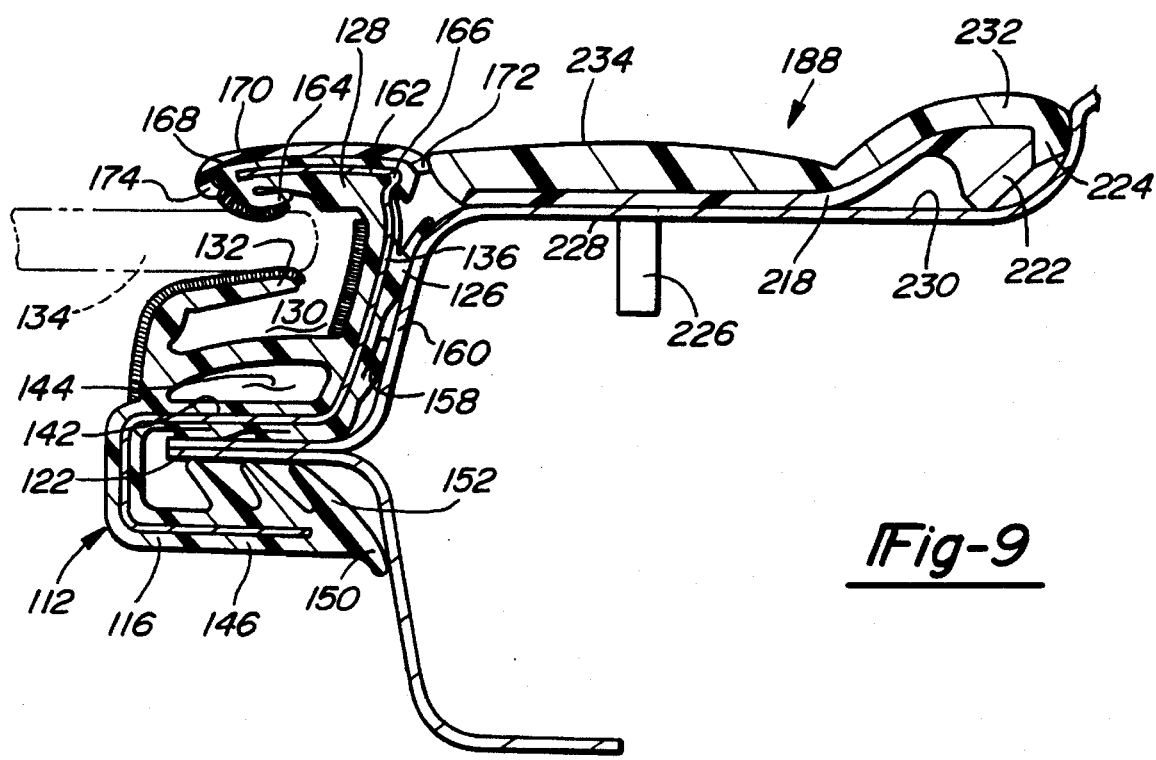
FIG. 9 is a cross-sectional view taken along line 9—9 of FIG. 6 illustrating the glass run channel and belt weatherstrip along the C pillar portion.
Figure 10:
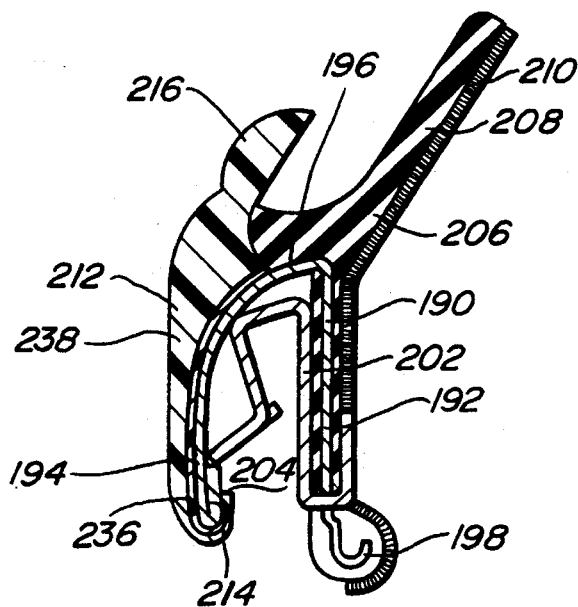
FIG. 10 is a sectional view taken along line 10—10 of FIG. 6 illustrating a section of the belt weatherstrip along the linear portion.

Referring to FIG. 8 a blown out perspective view of the glass run channel 112 and complimentary overlapping belt weatherstrip 114 portion taken along line 9—9 of FIG. 6 is provided. The belt weatherstrip 114 as further illustrated in FIG. 10 is a unitary piece in final form, however for convenience and assistance in understanding the structure it will be described as including a first linearly extending section 186 and a second rounded tail portion 188 which extends from the linear section 186 for ease in reading the specification. The linear section 186 includes a support member 190 in the form of an elongated metal strip which has, in cross-section, a first longer leg 192 and a second slightly shorter leg 194 joined by a web portion 196 to form a substantially U-shaped structure as shown more clearly in FIG. 10. Leg 192 includes an outwardly bent free end 198 for assistance in applying an elastomeric material. At various intervals along leg 192, punched out portions 200 as shown in FIG. 6 are provided for retaining a metallic clip 202 which extends into the belt weatherstrip channel 204. While the metallic clip 202 is optional, the clip generally assists in retaining the belt weatherstrip 114 over the pinch-weld flange (not shown). Leg 192 is provided with an elastomeric cover 206 such as EPDM rubber which encapsulates the leg and includes a portion which extends beyond the web portion 196 to provide the belt weatherstrip with a wiping lip 208. Preferably, the elastomeric cover 206 will be provided with flocking material 210 at least along the inner surface of wiping lip 208 to assist in raising and lower the glass panel.

The second, generally shorter leg 194 preferably is bowed slightly outwardly with the bowed portion extending away from the first leg 192. This second leg 194 is provided with a relatively dense decorative cover 212 including a first layer 236 disposed contiguously over the leg 192, preferably the first layer is formed from a polymeric material such as polyvinyl chloride, among others. Preferably, the layer 236 overlaps the lower longitudinal edge 214 of the metallic core. Cover 212 also includes a second layer 238 made from a polymeric material such as a commercially available acrylic styrene acetate polycarbonate known as XENOY™ which is available from General Electric—Plastics Division of Troy, Mich., among others. A rib 216 which extends beyond the web portion 196 and is also formed from the same material as the second layer is provided to protect the wiping lip 208.

The rounded tail portion 188 which extends from the linear portion 186 generally includes a rigid polymeric plate 218 having a detent area (not shown) which is disposed over and temporarily adhered to a portion of the second leg 194 which extends from the polymeric covering 212. The polymeric plate 218 includes inner surface 220 which includes an extending rim 222 disposed along the periphery 224 and a plurality of spaced apart post members 226 which fit within apertures 228 provided on the vehicle door frame. Ideally, the body portion will fit within a recessed area 230 provided along the vehicle door frame as illustrated most clearly in FIGS. 8 and 9.

Typically, the linearly extending portion 186 of the belt weatherstrip 114 is formed first and the tail portion 188 is subsequently added as will be described in greater detail below. In the manufacture of belt weatherstrip 114 first a metal strip of aluminum, steel or other suitable metal is provided. The metal strip is roll formed into the generally U-shaped configuration of support member 190 and then elastomeric cover 206 is extruded onto metal support member 190 along the first leg 192 and bonded thereto in a conventional manner. Next a relatively dense plastic 214 is extruded over the second leg 194 and bonded thereto. Metallic clips 202 are then positioned over the support member 190 along the cut out portions 200 of the first leg such that the metallic clips are contained within the flange receiving channel. The tail portion 188 is then attached to an extending portion of the second leg 194 as described above and additional plastic material is molded over the polymeric plate 218 to provide a continuous show surface along the belt weatherstrip. Preferably, the show surface along the tail portion 188 includes a raised face 232 which is a continuation of the linear portion and a recessed portion 234 which abuts the C pillar portion of the glass run channel upon attachment to the vehicle.

The invention has been described in an illustrative manner, and it is to be understood that the terminology which has been used is intended to describe the invention in a non-limiting manner. The invention as described therefore constitutes the preferred embodiments of the present invention, and it should be appreciated that the invention is susceptible to modification, variation and change without departing from the proper scope and fair meaning of the accompanying claims.

What is claimed is:

1. A weatherstrip assembly, comprising:

a glass run channel for an automobile including a plurality of sections joined along the corners, each section including a U-shaped portion which forms a mounting channel and an integral substantially L-shaped portion which forms a glass panel receiving channel including inner and outer legs joined by a web portion wherein the inner leg is shared by both the mounting channel and glass panel receiving channel and the outer leg includes first and second end portions, a reinforcing core extending into said outer leg, a first sealing lip extending from said inner leg in the direction of said outer leg and a substantially C-shaped rigid decorative covering mounted over said outer leg such that the decorative covering overlaps the end portions of said outer leg.

2. The weatherstrip assembly of claim 1, further comprising a band extending between the web and the sealing lip which is spaced apart from the inner leg thereby providing a gap between said inner leg and said band.

3. The weatherstrip assembly of claim 2, wherein an angled bracket having a first leg and a second leg is provided, said first leg of said bracket is disposed within the gap of a first glass run channel section and the second leg of the bracket is disposed within the gap of a corresponding second section of the glass run channel.

4. The weatherstrip assembly of claim 1, wherein a mesh screen extends between first and second joined sections of the decorative covering.

5. The weatherstrip assembly of claim 1, further comprising a belt weatherstrip including a first linearly extending portion having a generally U-shaped metallic support member including first and second legs joined by a web to form a channel, said first leg being longer than said second leg and including an elastomeric cover disposed along said first leg which extends beyond said web to form a wiping lip, said second leg including a first layer of relatively rigid polymeric material disposed contiguously over a portion of said second leg of the U-shaped metallic support member and a second layer of rigid polymeric material disposed over said first layer of relatively rigid polymeric material to form a decorative covering which also extends beyond said web.

6. The weatherstrip assembly of claim 5, wherein said belt weatherstrip includes a rounded integral tail portion attachable to the vehicle door frame which extends from said first linearly extending portion, said tail portion including a rigid insert attached to the second leg of the linearly extending portion having an inner surface which includes a plurality of post members for engaging locating holes provided along the vehicle door frame and an outer surface which is coated with a decorative covering material which blends with the second layer of said linearly extending portion.

7. The weatherstrip assembly of claim 5, wherein the decorative covering of said second leg is more rigid than the elastomeric cover of said first leg.

8. A weatherstrip assembly attachable to an automotive vehicle along a window opening, said weatherstrip assembly comprising:

a glass run channel including a plurality of sections joined along the corners, each section including a U-shaped portion having a mounting channel and an integral substantially L-shaped portion which forms a glass panel receiving channel including inner and outer legs joined by a web portion wherein the inner leg is shared by both the mounting channel and the glass receiving channel and the outer leg includes first and second end portions, a first sealing lip extending from said inner leg in the direction of said outer leg across the glass panel receiving channel, a reinforcing core extending into said outer leg and a rigid substantially C-shaped decorative covering mounted over said outer leg such that the first and second ends of the decorative covering overlap the end portions of said outer leg; and a belt weatherstrip including a first linearly extending portion having a generally U-shaped metallic support member including first and second legs joined by a web to form a channel, said first leg being longer then said second leg and including an elastomeric cover disposed along said first leg which extends beyond said web to form a wiping lip, said second leg including a first layer of relatively rigid polymeric material disposed contiguously over a portion of said second leg of the U-shaped metallic support member and a second layer of relatively rigid polymeric material disposed over said first layer to form a decorative covering which also extends beyond said web.

9. The weatherstrip assembly of claim 8, further comprising a band extending between the web and the sealing lip which is spaced apart from the inner leg thereby providing a gap between said inner leg and said band.

10. The weatherstrip assembly of claim 9, wherein an angled bracket having a first leg and a second leg is provided, said first leg of said bracket is disposed within the gap of a first glass run channel section and the second leg of the bracket is disposed within the gap of a corresponding second section of the glass run channel.

11. The weatherstrip assembly of claim 10, wherein a mesh screen extends between first and second joined sections of the decorative covering.

12. The weatherstrip assembly of claim 9, wherein said belt weatherstrip includes a rounded integral tail portion attachable to the vehicle door frame which extends from said first linear portion, said tail portion including a rigid insert attached to the second leg of the linearly extending portion having an inner surface which includes a plurality of post members for engaging locating holes provided along the vehicle door frame and an outer surface which is coated with a decorative covering which blends with the decorative covering of said linear portion.

13. A method of manufacturing a glass run channel formed from a plurality of sections, comprising the steps of:
   (a) extruding an elastomeric material over reinforcing core sections;
   (b) forming the reinforcing core sections to an overall desired shape including an outer leg having first and second ends;
   (c) joining two reinforcing core sections with a bracket member to form a joint;
   (d) attaching performed C-shaped rigid decorative coverings over the outer leg of each section; and
   (e) providing additional elastomeric material along the joint to permanently connect said first and second sections.

14. A weatherstrip assembly, comprising:
   a glass run channel for an automobile including a plurality of sections joined along the corners, each section including a U-shaped portion which forms a mounting channel and an integral substantially L-shaped portion which forms a glass panel receiving channel including inner and outer legs joined by a web portion wherein the inner leg is shared by both the mounting channel and the glass panel receiving channel, a reinforcing core extending into said outer leg, a first sealing lip extending from said inner leg in the direction of said outer leg, a band spaced apart from said inner leg extending between said web and the first sealing lip, a gap located between said inner leg and said band, and a substantially C-shaped rigid decorative covering mounted over said outer leg;
   an angled bracket having first and second legs, wherein said first leg is disposed within the gap provided on a first glass run channel section and said second leg is disposed within the gap of a second mating glass run channel section; and
   a mesh screen attached to first and second joined sections of the decorative covering.

15. A weatherstrip assembly, comprising:
   a glass run channel for an automobile; and
   a belt weatherstrip useful in association with said glass run channel to seal a window opening including a first linearly extending portion having a generally U-shaped support member including first and second legs joined by a web to form a channel, said first leg being longer than said second leg and including an elastomeric cover disposed along said first leg which extends beyond said web to form a wiping lip, said second leg including a relatively rigid polymeric material which extends beyond said web and forms a decorative covering; and
   a rounded integral tail portion attachable to the vehicle door frame extending from said first linearly extending portion, said tail portion including a rigid insert attached to the second leg of the linearly extending portion having an inner surface including means for engaging the vehicle door frame and an outer surface which is coated with a decorative covering material which blends with the second layer of said linearly extending portion.

16. The weatherstrip assembly of claim 15, wherein the decorative covering of said belt weatherstrip is more rigid than the elastomeric cover of said belt weatherstrip first leg.

* * * * *